(12) United States Patent  
Lai et al.

(10) Patent No.: US 12,489,468 B2  
(45) Date of Patent: Dec. 2, 2025

(54) WIRELESS COMMUNICATION DEVICE AND METHOD FOR DETERMINING DATA TRANSMISSION RATE

(71) Applicant: Realtek Semiconductor Corp., HsinChu (TW)

(72) Inventors: Wei-Chi Lai, HsinChu (TW); Wei-Hsuan Chang, HsinChu (TW); Chien-Jung Huang, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 387 days.

(21) Appl. No.: 18/097,511

(22) Filed: Jan. 17, 2023

(65) Prior Publication Data

US 2023/0268938 A1    Aug. 24, 2023

(30) Foreign Application Priority Data

Feb. 24, 2022  (TW) .................... 111106760

(51) Int. Cl.
*H04L 1/00*    (2006.01)
*H04B 1/00*    (2006.01)
*H04W 28/22*   (2009.01)

(52) U.S. Cl.
CPC ......... *H04B 1/0028* (2013.01); *H04L 1/0009* (2013.01); *H04W 28/22* (2013.01)

(58) Field of Classification Search
CPC ... H04B 1/0028; H04L 1/0009; H04L 1/0003; H04W 28/22
See application file for complete search history.

(56) References Cited

U.S. PATENT DOCUMENTS

| | | | |
|---|---|---|---|
| 6,690,652 B1* | 2/2004 | Sadri ...................... | H04L 1/0003 370/252 |
| 2007/0064735 A1* | 3/2007 | Hoo ....................... | H04L 1/0005 370/468 |
| 2008/0139133 A1* | 6/2008 | Usuda ............... | H04W 28/0284 455/95 |

(Continued)

FOREIGN PATENT DOCUMENTS

| | | |
|---|---|---|
| CN | 102237971 B | 9/2015 |
| EP | 2572467 B1 | 11/2011 |

(Continued)

*Primary Examiner* — Kenneth T Lam
(74) *Attorney, Agent, or Firm* — Winston Hsu (57) ABSTRACT

A wireless communication device includes a processor, a baseband signal processing circuit and a wireless transceiver circuit. The processor determines a transmission need, determines a transmission rate according to the transmission need and a channel condition, and provides data and information regarding the transmission rate to the baseband signal processing circuit. The information regarding the transmission rate includes at least one of a selected transmission standard, a selected physical layer data transmission rate and a selected modulation and coding scheme. The baseband signal processing circuit is coupled to the processor and processes the data according to the information regarding the transmission rate to accordingly generate a packet. The wireless transceiver circuit is coupled to the baseband signal processing circuit and transmits the packet.

14 Claims, 7 Drawing Sheets

(56) References Cited

U.S. PATENT DOCUMENTS

| | | | |
|---|---|---|---|
| 2009/0005060 A1* | 1/2009 | Mazawa | H04W 28/22 |
| | | | 455/452.2 |
| 2010/0329229 A1* | 12/2010 | Lipka | H04L 27/2636 |
| | | | 370/344 |
| 2011/0007844 A1* | 1/2011 | Park | H04B 1/7097 |
| | | | 375/302 |
| 2013/0077661 A1* | 3/2013 | Jacobsen | H04L 27/0008 |
| | | | 375/219 |
| 2015/0236931 A1 | 8/2015 | Merlin | |
| 2017/0237673 A1* | 8/2017 | Law | H04W 4/023 |
| | | | 370/338 |
| 2021/0167889 A1* | 6/2021 | Yang | H04L 1/0026 |
| 2021/0176657 A1* | 6/2021 | Yang | H04L 5/0007 |
| 2024/0080127 A1* | 3/2024 | Gong | H04L 69/06 |

FOREIGN PATENT DOCUMENTS

| | | |
|---|---|---|
| TW | I466564 B | 12/2014 |
| WO | 2017206781 A1 | 12/2017 |

* cited by examiner

| Modulation | Coding_Rate | PHY_Rate (Mbit/s) |
|---|---|---|
| BPSK | 1/2 | 6 |
| BPSK | 3/4 | 9 |
| QPSK | 1/2 | 12 |
| QPSK | 3/4 | 18 |
| 16-QAM | 1/2 | 24 |
| 16-QAM | 3/4 | 36 |
| 64-QAM | 2/3 | 48 |
| 64-QAM | 3/4 | 54 |

FIG. 5

| HT_MCS_Index | VHT_MCS_Index | Modulation | Coding_Rate | PHY_Rate (Mbit/s) |
|---|---|---|---|---|
| 0 | 0 | BPSK | 1/2 | 6.5 |
| 1 | 1 | QPSK | 1/2 | 13 |
| 2 | 2 | QPSK | 3/4 | 19.5 |
| 3 | 3 | 16-QAM | 1/2 | 26 |
| 4 | 4 | 16-QAM | 3/4 | 39 |
| 5 | 5 | 64-QAM | 2/3 | 52 |
| 6 | 6 | 64-QAM | 3/4 | 58.5 |
| 7 | 7 | 64-QAM | 5/6 | 65 |
| NA | 8 | 256-QAM | 3/4 | 78 |

WIRELESS COMMUNICATION DEVICE AND METHOD FOR DETERMINING DATA TRANSMISSION RATE

BACKGROUND OF THE INVENTION

1. Field of the Invention

The invention relates to a Rate Adaptation (RA) mechanism of a wireless communication device, more particular to a method for intelligently and flexibly determining a data transmission rate according to user needs and a wireless communication device implementing the method.

2. Description of the Prior Art

IEEE 802.11 is a part of the IEEE 802 Local Area Network (LAN) standard series, which specifies Media Access Control (MAC) and Physical layer (PHY) protocol sets for implementing computer communication in wireless LAN. IEEE 802.11 is mainly utilized in home and office networks to allow devices such as laptops, printers, smartphones, and other devices to communicate with each other and access the Internet without using a network line. IEEE 802.11 establishes communications using a variety of frequency bands, including but not limited to the 2.4 GHz, 5 GHz, 6 GHz, and 60 GHz frequency bands. Although the IEEE 802.11 standard lists the channels that may be used, the actual available RF spectrum allowed to be used varies by areas.

Generally, in a wireless communication system, there are three requirements to be met for a data packet to be correctly sent from a transmitter and successfully received by a receiver, including: an appropriate transmission rate, sufficient transmission power, and good signal quality. With the evolution of the IEEE 802.11 standard, the data rate and throughput also continue to increase. However, the transmission rate and amount of transmission may affect the final transmission power. Therefore, how to make the wireless communication device to intelligently perform rate adaptation (RA) has become a topic worthy of study.

SUMMARY OF THE INVENTION

It is an objective of the invention to provide a method and a wireless communication device implementing the method for intelligently and flexibly determining a data transmission rate according to user needs.

According to an embodiment of the invention, a wireless communication device comprises a processor, a baseband signal processing circuit and a wireless transceiver circuit. The processor is configured to determine a transmission need, determine a transmission rate according to a channel condition and the transmission need, and provide data and information regarding the transmission rate to a baseband signal processing circuit. The information regarding the transmission rate comprises at least one of a selected transmission standard, a selected physical layer data transmission rate and a selected modulation and coding scheme. The baseband signal processing circuit is coupled to the processor and configured to process the data according to the information regarding the transmission rate to generate a packet. The wireless transceiver circuit is coupled to the baseband signal processing circuit and configured to transmit the packet.

According to another embodiment of the invention, a method for determining data transmission rate comprises: determining a channel condition of a wireless communication environment where a wireless communication device is located; determining a transmission need of the wireless communication device; determining a transmission rate according to the channel condition and the transmission need, wherein the transmission rate is defined by at least one of a selected transmission standard, a selected physical layer data transmission rate and a selected modulation and coding scheme; and processing data according to the transmission rate to generate a packet.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
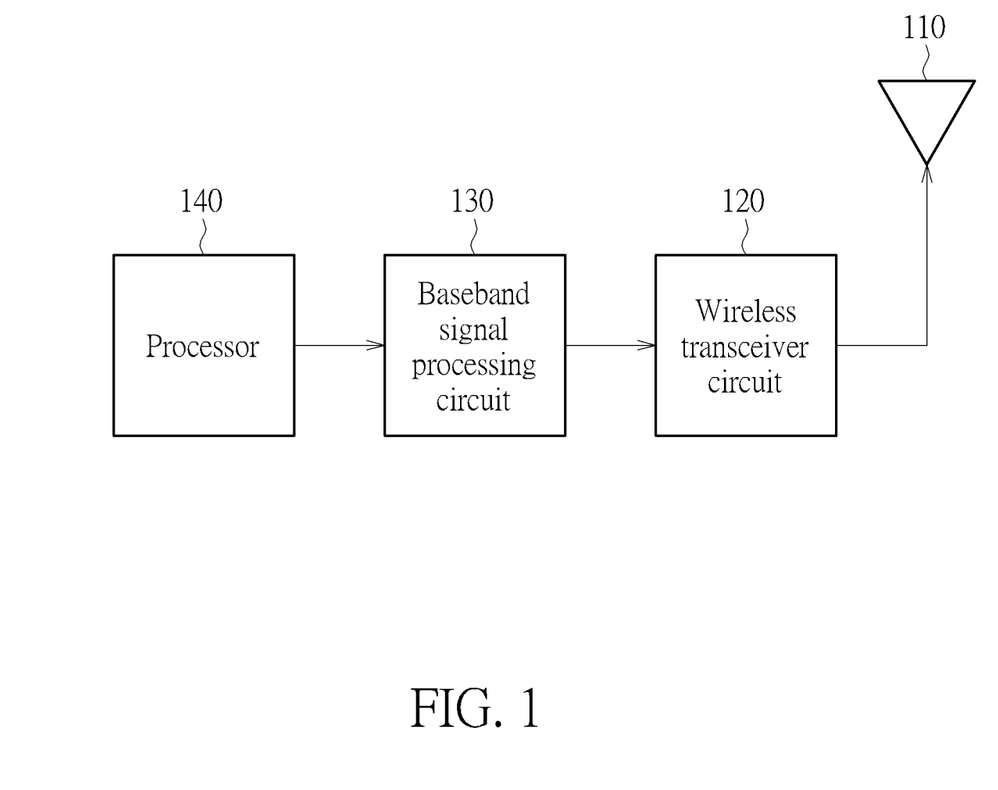
FIG. 1 shows an exemplary block diagram of a wireless communication device according to an embodiment of the invention.

FIG. 1 shows an exemplary block diagram of a wireless communication device according to an embodiment of the invention. The wireless communication device 100 may comprise at least one antenna 110, a wireless transceiver circuit 120, a baseband signal processing circuit 130 and a processor 140. It is to be noted that, in order to clarify the concept of the invention, FIG. 1 presents a simplified block diagram of a wireless communication device in which only the components relevant to the invention are shown. As will be readily appreciated by a person of ordinary skill in the art, a wireless communication device may further comprise other components not shown in FIG. 1 and configured for implementing the functions of wireless communication and related signal processing.

The wireless transceiver circuit 120 is configured to receive wireless signals through the antenna 110 and process the received signals, or, to process the signals to be transmitted and transmit corresponding packets through the antenna 110. For example, the wireless transceiver circuit 120 may perform the processing of power amplifying or attenuating, and perform the frequency up conversion or down conversion on signals, so as to convert the baseband signal into a radio frequency signal or convert the radio frequency signal into a baseband signal. The baseband signal processing circuit 130 is configured to process the baseband signals. More specifically, the baseband signal processing circuit 130 may process the baseband signals according to a selected transmission standard, a selected physical layer data transmission rate and/or a selected modulation and coding scheme (MCS), so as to convert the data to be transmitted into a transmission packet in compliance with the corresponding communication protocol, or convert a received packet into data in a data format that can be processed by the back-end circuit in compliance with the corresponding communication protocol. The processor 140 is configured to control the operation of the wireless communication device 100, and the processor 140 may comprise a plurality of sub-circuits or functional modules implemented by any one of hardware, firmware or software or a combination thereof to execute the required signal processing functions. For example, the processor 140 may comprise a sub-circuit or functional module for channel evaluation, a sub-circuit or functional module for transmission need evaluation, a sub-circuit or functional module for rate adaptation, and the like. In the embodiment of the invention, through the cooperative operation of the sub-circuits or functional modules, the processor 140 may determine a channel condition of a wireless communication environment in which the wireless communication device 100 is currently located, determine a current transmission need of the wireless communication device 100, and determine a current transmission rate (TX Rate) which may be an optimal TX rate for the current condition according to the channel condition and transmission need. Note that as used herein, "A and/or B" and "at least one of A and B" refer to any combination of one or more of the listed associated items (A, B) (e.g., A, B or a combination of A and B).

In the embodiments of the invention, the wireless communication device 100 (and the antenna 110, the wireless transceiver circuit 120, the baseband signal processing circuit 130, the processor 140 . . . etc. comprised therein) may be a device capable of supporting a series of IEEE 802.11 standards, which at least comprises, for example but not limited to, 802.11a, 802.11g, 802.11n, 802.11ac, 802.11ax, etc., wherein 802.11a and 802.11g are the transmission standards using OFDM (Orthogonal Frequency Division Multiplexing) based waveform and transmission rate, 802.11n is a transmission standard with high throughout (HT) capability, and 802.11ac is a transmission standard with very high throughout (VHT) capability, 802.11ax is a transmission standard with high efficiency (HE) transmission rate. For example, the wireless communication device 100 may be an access point (AP) or a device (Station), such as a mobile phone, a smart watch or a tablet computer, that supports the 802.11 standards.

In addition, in the embodiment of the invention, when the processor 140 determines the currently optimal transmission rate (TX Rate), the processor 140 may further determine the currently optimal transmission standard as a selected transmission standard, and the selected transmission standard may be selected from a group comprising the aforementioned IEEE 802.11 standards supported by the wireless communication device 100.

Figure 2:
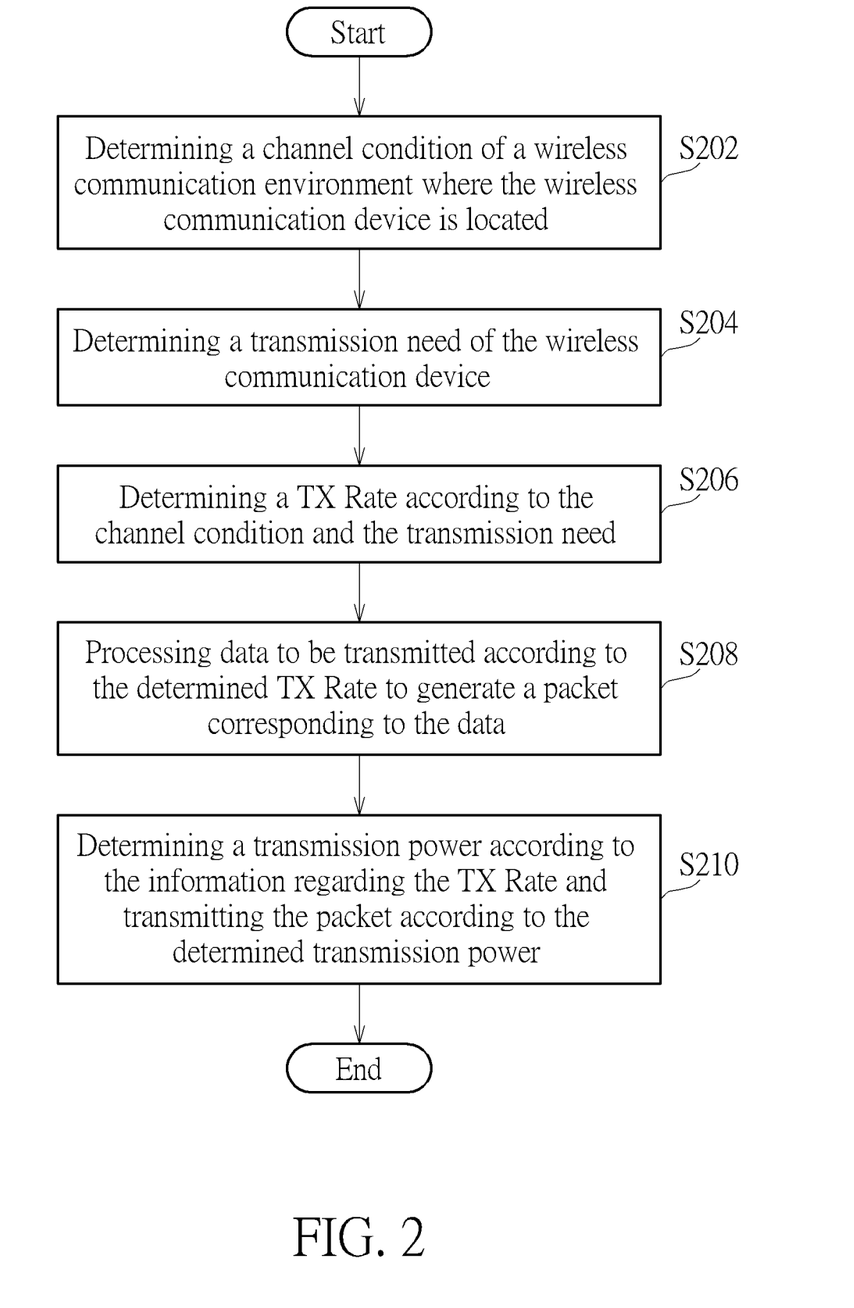
FIG. 2 is an exemplary flowchart of a method for determining a data transmission rate according to an embodiment of the invention.

FIG. 2 is an exemplary flowchart of a method performed by the wireless communication device 100 for determining a data transmission rate according to an embodiment of the invention. The method comprises the following steps:

Step S202: determining a channel condition of a wireless communication environment where the wireless communication device 100 is located. As described above, the processor 140 or the corresponding sub-circuit or functional module for channel evaluation may perform channel evaluation according to the received signal to determine the current channel condition. Those skilled in the art will be readily appreciated that, as there are many well-known channel evaluation methods that have been well-developed in the technical field, details of channel evaluation method are not provided here for brevity and the invention is not limited to use any specific channel evaluation method to evaluate the channel condition.

Step S204: determining a transmission need of the wireless communication device 100. As described above, the processor 140 or the corresponding sub-circuit or functional module for transmission need evaluation may determine the transmission need according to an application or a function of the wireless communication device currently been activated by an user of the wireless communication device 100, or an operation currently has been performed by the user. It should be noted that the invention does not limit the sequence of performing step S202 and step S204.

Step S206: determining a transmission rate (TX Rate) according to the channel condition and the transmission need. In the embodiments of the invention, the transmission rate (TX Rate) may be defined by at least one of a selected transmission standard, a selected physical layer data transmission rate and a selected modulation and coding scheme (MCS). As mentioned above, the processor 140 or the corresponding sub-circuit or functional module for rate adaptation may determine the currently optimal transmission rate (TX Rate) according to the current channel condition and transmission need, and may provide the information regarding the transmission rate (TX Rate) to the baseband signal processing circuit 130. In the embodiments of the invention, the information of the transmission rate may comprise the corresponding setting value of at least one of the aforementioned selected transmission standard, the selected physical layer data transmission rate, and the selected MCS.

Step S208: processing data to be transmitted by the baseband signal processing circuit 130 according to the determined transmission rate to generate a packet corresponding to the data. After the data processing, the baseband signal processing circuit 130 may provide the packet to be transmitted to the wireless transceiver circuit 120.

Step S210: determining a transmission power by the wireless transceiver circuit 120 according to the information regarding the transmission rate and transmitting the packet provided by the baseband signal processing circuit 130 according to the determined transmission power. In the embodiment of the invention, the processor 140 or the baseband signal processing circuit 130 may provide information regarding the currently determined transmission rate to the wireless transceiver circuit 120, or the wireless transceiver circuit 120 may directly obtain information regarding the currently determined transmission rate according to the content of the packet received from the baseband signal processing circuit 130.

According to an embodiment of the invention, the processor 140 may predefine at least one transmission standard corresponding to (or, suitable for) high throughput (hereinafter referred to as the first transmission standard) and at least one transmission standard corresponding to (or, suitable for) long distance transmission (hereinafter referred to as the second transmission standard).

For example, the processor 140 may select proper standards as said first transmission standard and said second transmission standard according to at least one of a number of sub-carriers, a transmit spectrum mask (TX mask), a physical layer data transmission rate and a packet aggregation capability corresponding to each of a plurality of transmission standards, such as the IEEE 802.11 standards, supported by the wireless communication device 100. When determining the transmission rate in step S206, the processor 140 or the corresponding sub-circuit or functional module for rate adaptation may determine to select the first transmission standard or the second transmission standard as the selected transmission standard according to the transmission need.

Taking the standards 802.11a, 802.11n, and 802.11ac as examples, as specified in the corresponding specification of each standard, the number of sub-carriers that can be effectively used under the application of 20 MHz channel bandwidth are respectively 52, 56, 56. In the case of using the same transmission power to transmit packets, since the number of sub-carriers that can be effectively used in 802.11a is the least among the three, the sub-carriers transmitted in compliance with the 802.11a standard may have the maximum transmission power. Therefore, the processor 140 may define the 802.11a standard as a transmission standard more suitable for long distance transmission (i.e., the aforementioned transmission standard corresponding to long distance transmission). In other words, since the transmission power that can be actually distributed to each sub-carrier is inversely proportional to the number of sub-carriers, in the embodiments of the invention, the processor 140 may set the standard with the smallest or relatively small number of sub-carriers as the transmission standard that is more suitable for long distance transmission.

Figure 3:
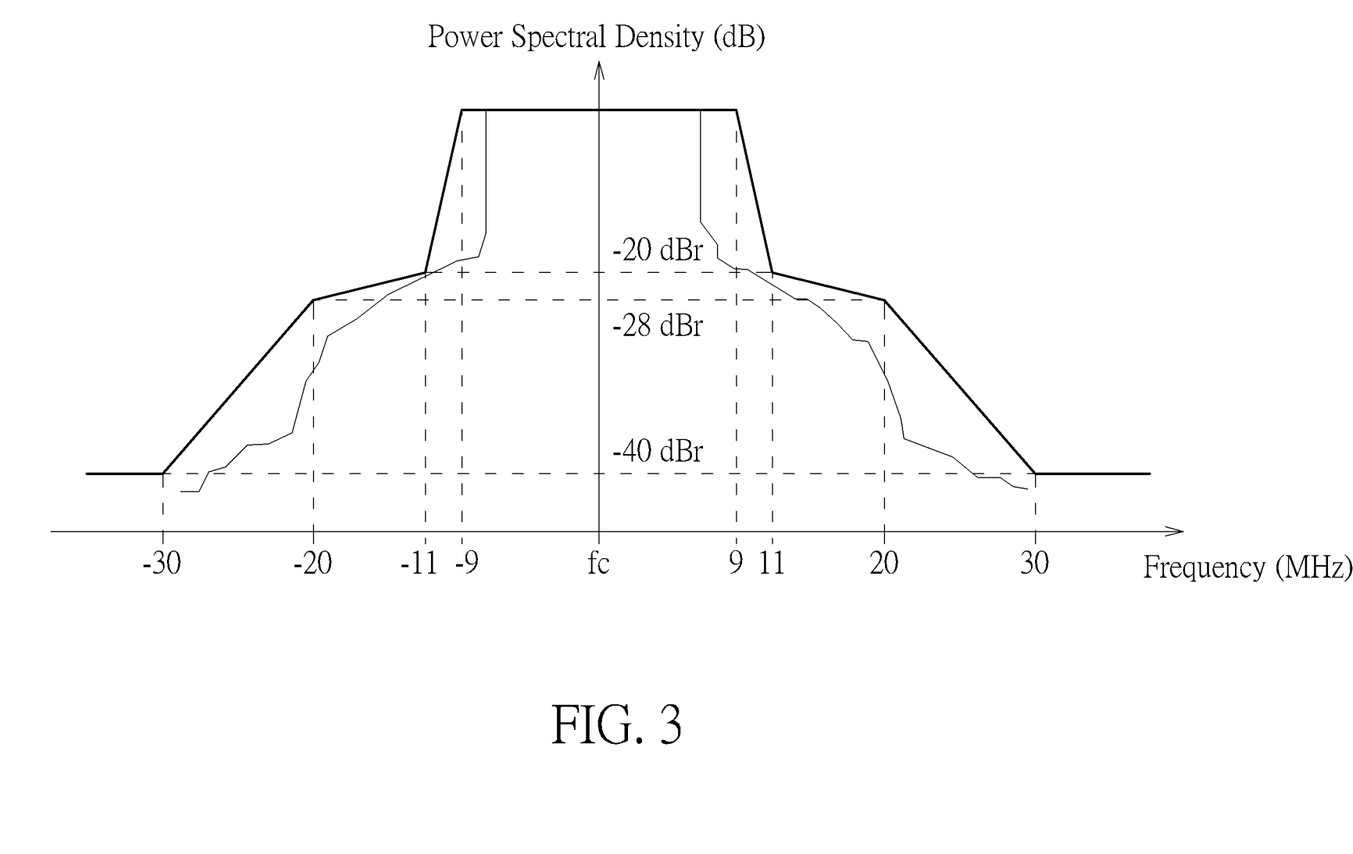
FIG. 3 illustrates the transmit spectrum masks specified in the 802.11a and 802.11ac standards.
Figure 4:
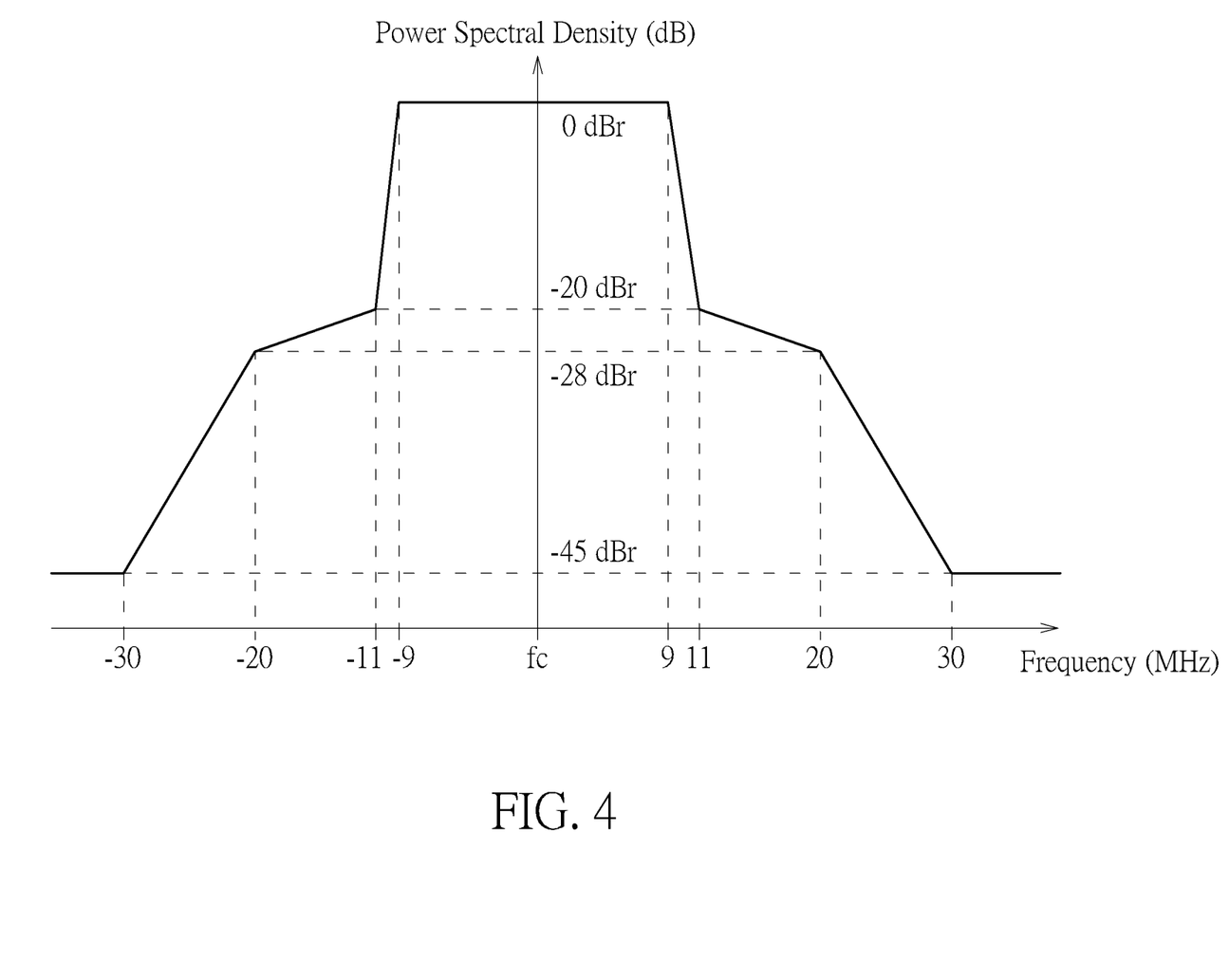
FIG. 4 illustrates the transmit spectrum mask specified in the 802.11n standard.

FIG. 3 illustrates the transmit spectrum masks specified in the 802.11a and 802.11ac standards. FIG. 4 illustrates the transmit spectrum mask specified in the 802.11n standard.

To avoid interference between adjacent channels, the IEEE 802.11 standard series use a transmit spectrum mask to standardize the distribution of signal strength for each channel. The transmit spectrum mask shows necessary offset or difference in signal strength or power of each frequency component of the transmission signal with respect to the center frequency fc. Therefore, the power spectral density distribution of the signals transmitted in compliance with the IEEE 802.11 standard series shall not exceed the transmit spectrum mask defined by the specification.

As shown in FIG. 3, there is a 40 dBm difference at the frequency fc±30 MHz (the labeled −40 dBr in FIG. 3), where the frequency fc is the center frequency of the signal. As shown in FIG. 4, there is a 45 dBm difference at the frequency fc±30 MHz (the labeled −45 dBr in FIG. 4). Therefore, again taking the standards 802.11a, 802.11n and 802.11ac as examples, since the required strength or power difference in 802.11n is higher than 802.11a and 802.11ac, in order to make the power distribution to satisfy the requirement of the corresponding transmit spectrum mask, for the signal to be transmitted in compliance with the 802.11n standard, the wireless communication device 100 must transmit it with a lower transmission power. That is, due to the limit of the transmit spectrum mask, the transmission power in 802.11a and 802.11ac may be greater than that in 802.11n. Therefore, the processor may define the 802.11a or 802.11ac standard as a transmission standard more suitable for long distance transmission. In other words, since the offset or difference in signal strength or power defined by the transmit spectrum mask will affect the power to be output by the wireless communication device 100, the offset or difference in signal strength or power defined by the corresponding standard is inversely proportional to the transmission power of the signal. In the embodiments of the invention, the processor 140 may select the transmission standard requesting the smallest or relative small signal strength or power difference as the transmission standard suitable for long distance transmission.

Figure 5:
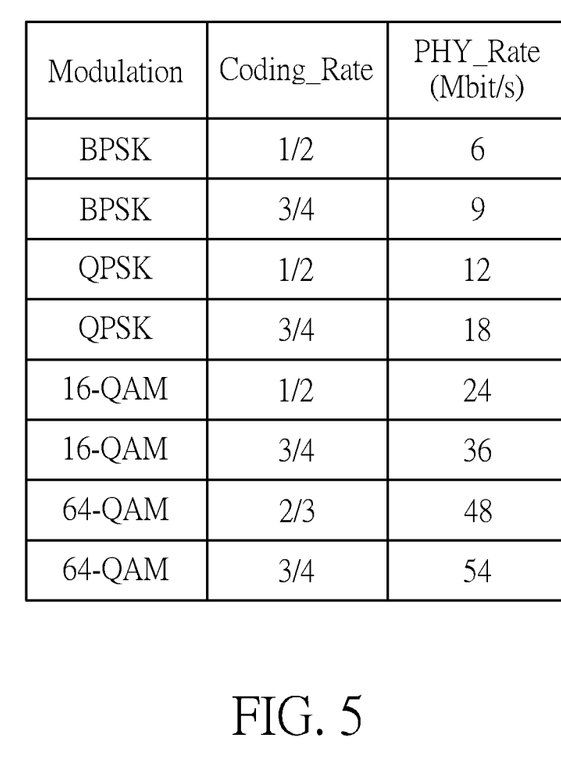
FIG. 5 is a table illustrating the modulation schemes, coding rates and PHY rates defined in the specification of 802.11a standard.
Figure 6:
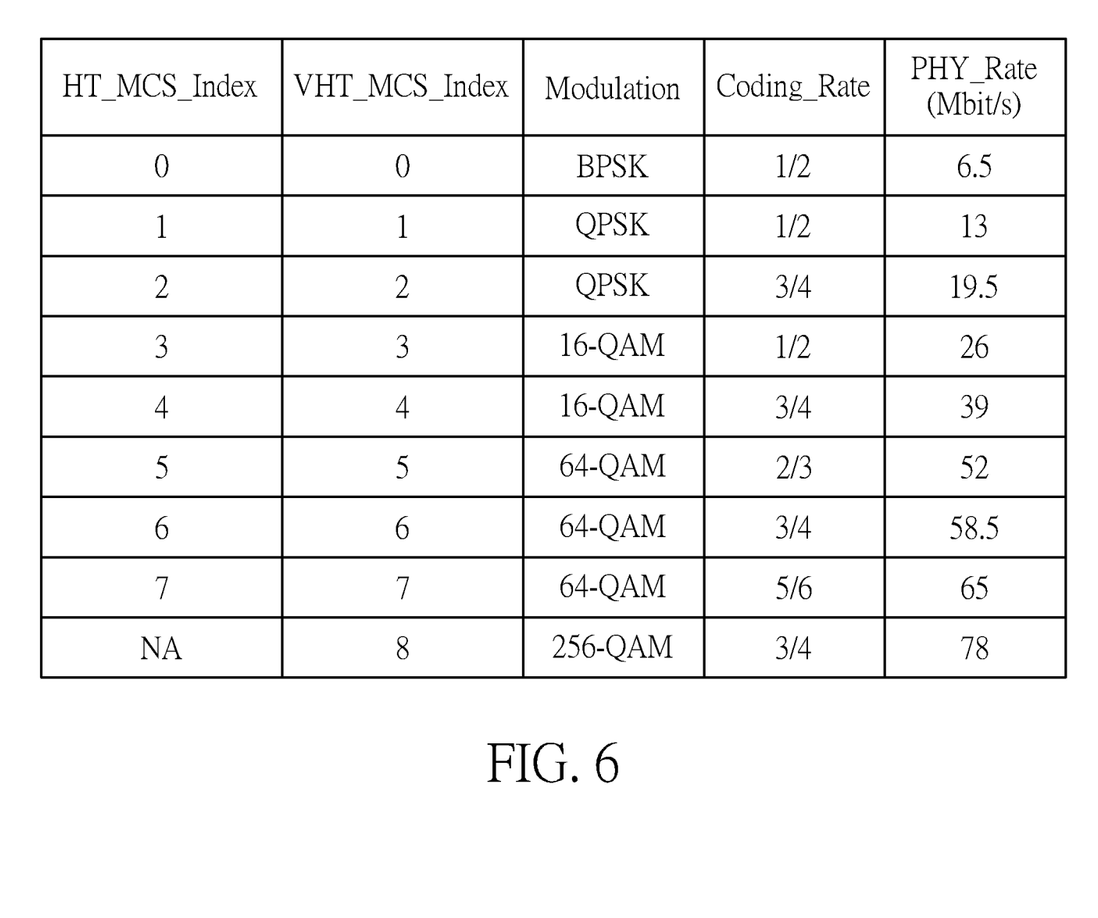
FIG. 6 is a table illustrating the modulation schemes, coding rates and PHY rates corresponding to each MCS defined in the specifications of 802.11n and 802.11ac standards.

FIG. 5 is a table illustrating the modulation schemes, coding rates and physical layer data transmission rates (i.e., PHY rates) defined in the specification of 802.11a standard. FIG. 6 is a table illustrating the modulation schemes, coding rates and PHY rates corresponding to each modulation and coding scheme (MCS) defined in the specifications of 802.11n and 802.11ac standards. The tables in FIG. 5 and FIG. 6 show the adopted modulation schemes and the corresponding coding rates as well as the achievable PHY rates for different MCS under the same transmission setting: 20 MHz channel bandwidth, 1T1R transmission mode and long guard interval. In order to simplify the content of the diagram, in the figures, the text 'HT_MCS_Index' represents the index value of the MCS associated with the 802.11n standard, the text 'VHT_MCS_Index' represents the index value of the MCS associated with the 802.11ac standard, the text 'Modulation' represents the modulation scheme, the text 'Coding_Rate' represents the coding rate, and the text 'PHY_rate' represents the PHY rate.

Comparing FIG. 5 and FIG. 6, it can be found that under the same modulation scheme and coding rate, 802.11n and 802.11ac standards usually have a larger PHY rate. Since the PHY rate is proportional to the transmission throughput, in the embodiments of the invention, the processor 140 may select the standard with a larger PHY rate, such as any of the 802.11n and 802.11ac in this example, as a transmission standard suitable for high throughput transmission (i.e., the aforementioned transmission standard corresponding to high throughput). In addition, since the maximum index of the MCS supported by the 802.11ac standard is 8, but the MCS of index 8 is not supported by the 802.11n (shown by 'NA' in FIG. 6), in one embodiment of the invention, the processor 140 may also directly set 802.11ac as a transmission standard suitable for high throughput transmission.

In addition, according to yet another embodiment of the invention, taking the standards 802.11a, 802.11n, and 802.11ac again as examples, since frame aggregation is defined in both 802.11n and 802.11ac, which makes the 802.11n and 802.11ac standards to be capable of supporting high-level packet aggregation transmission. Therefore, the processor 140 may select the standard with packet aggregation capability, such as any of the 802.11n and 802.11ac in this example, as a standard suitable for high throughput transmission.

It is to be noted that, although the above descriptions mainly use of the standards of 802.11a, 802.11n, and 802.11ac as examples and the embodiments are mainly based on the application of 20 MHz channel bandwidth, the invention is not limited thereto. In other embodiments of the invention, the processor 140 may also compare the transmission parameters corresponding to different transmission standards based on the application of other channel bandwidths, so as to select a transmission standard with higher transmission power as a transmission standard corresponding to long distance transmission, and select the transmission standard with higher transmission throughput as the transmission standard corresponding to high throughput transmission.

According to an embodiment of the invention, when the processor 140 determines the transmission rate, for example, when step S206 is performed, the processor 140 may first select a MCS or a PHY rate according to the channel condition, and then determine to select the transmission standard corresponding to long distance transmission or the transmission standard corresponding to the high throughput transmission according to the transmission need. For example, the processor 140 may first select a MCS or a lower limit of a target PHY rate to be achieved according to the channel condition. If there is more than one transmission standard supports the selected MCS or the target PHY rate (e.g. when there is more than one supported PHY rate higher than the aforementioned lower limit of the target PHY rate), the processor 140 may further determine to select the transmission standard corresponding to long distance transmission or the transmission standard corresponding to the high throughput transmission according to the transmission need.

According to another embodiment of the invention, when the processor 140 determines that the transmission rate (TX Rate) has to be adjusted according to the channel condition, for example, when the channel condition changes, the processor 140 may select a MCS or a PHY rate according to the latest channel condition, and determine to select the transmission standard corresponding to long distance transmission or the transmission standard corresponding to the high throughput transmission according to the transmission need.

A practical example is provided for more detailed description. Suppose that the processor determines, according to the channel condition, to use the Binary Phase Shift Keying (BPSK) modulation scheme with ½ bit rate as the selected MCS, or determines, according to the channel condition, that the lower limit of the target PHY rate is 600 Mbit/s, since all of the 802.11a, 802.11n, 802.11ac standards support the selected MCS and the target PHY rate, the processor 140 may further determine whether the current transmission need is long distance transmission or high throughput transmission. If the current transmission need is long distance transmission, the processor 140 may decide to adopt the 802.11a standard for signal transmission, because the transmission power may be the highest among the three, so the currently optimal transmission rate (TX Rate) may be 802.11a (or called OFDM) 6 Mbit/s, the corresponding modulation is BPSK, and the coding rate is ½. If the current transmission need is high throughput transmission, the processor 140 may decide to adopt the 802.11ac or 802.11n standard for signal transmission. Therefore, the current optimal transmission rate (TX Rate) may be 802.11n (or called HT) or 802.11ac (or called VHT) 6.5 Mbit/s, the corresponding modulation is BPSK, and the coding rate is ½. The processor 140 may provide information regarding the determined transmission rate, for example, the information may be expressed as (OFDM, 6 Mbit/s), or (HT, MCS_Index=0) or (VHT, MCS_Index=0), to the baseband signal processing circuit 130, so that the baseband signal processing circuit 130 may convert the data to be transmitted into a corresponding TX packet based on this setting. In addition, the wireless transceiver circuit 120 may also determine a corresponding transmission power according to the information regarding the transmission rate.

Figure 7:
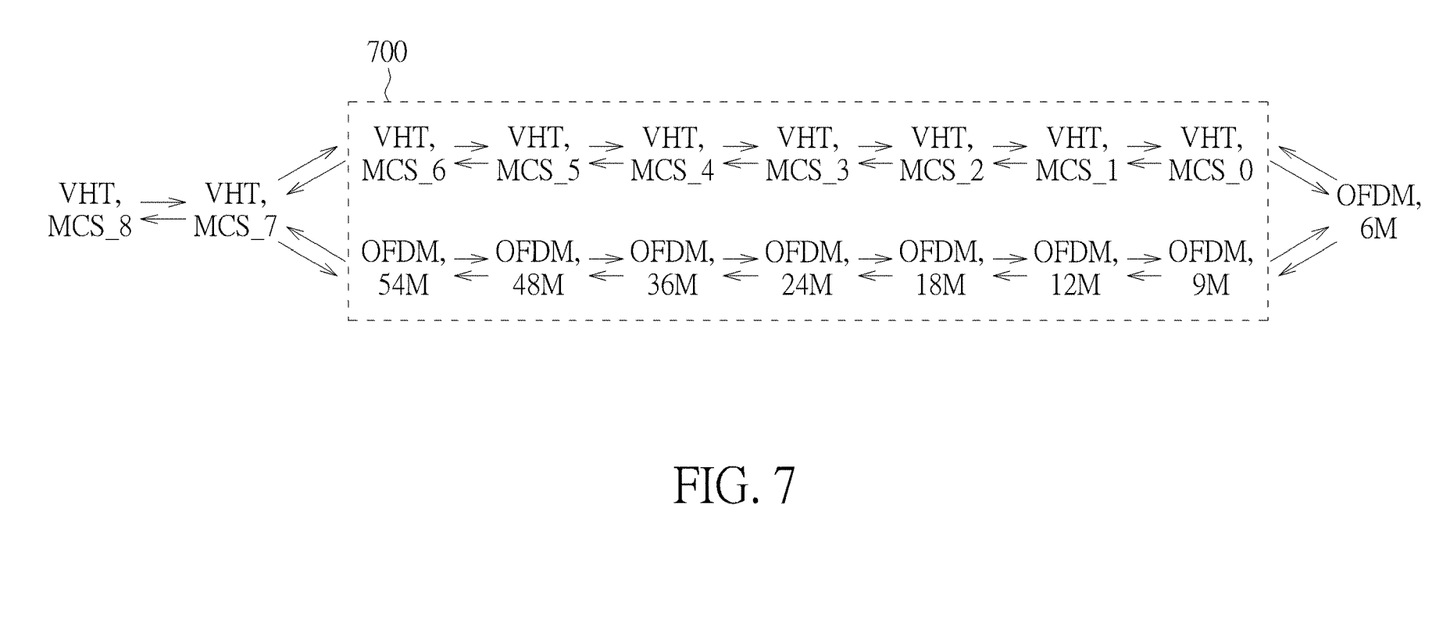
FIG. 7 shows exemplary rate adaptations according to an embodiment of the invention.

FIG. 7 shows exemplary rate adaptations according to an embodiment of the invention, which are the rate adaptations on the basis of 20 MHz channel bandwidth application. In this example, the adjustment to the right is the adjustment to decrease the transmission rate, and the adjustment to the left is the adjustment to increase the transmission rate. The text 'VHT' in FIG. 7 represents the 802.11ac standard, and 'MCS_X' represents the modulation and coding scheme with the MCS index value of X, and the text OFDM' in FIG. 7 represents the 802.11a standard, and 'YM' represents the MCS with a physical layer data transmission rate of Y Mbit/s. As described above, at least one or a combination of the selected transmission standard, physical layer data transmission rate, and MCS may define a corresponding transmission rate (TX Rate).

According to an embodiment of the invention, the processor 140 may define a range of flexible rate adaptation, such as the range of flexible rate adaptation 700 shown in FIG. 7. The range of flexible rate adaptation 700 may comprise a plurality of rate adaptation paths, and each rate adaptation path may correspond to at least one transmission need, which means that the processor 140 may select, based on a predetermined transmission need, a corresponding rate adaptation path to perform rate adaptation, and the transmission rates within the range of flexible rate adaptation 700 are the transmission rates that are supported by more than one standard. Taking the range of flexible rate adaptation 700 as an example, the range of flexible rate adaptation 700 may comprise two rate adaptation paths, where the upper rate adaptation path may correspond to the need of high throughput transmission, which means that the upper path is a rate adaptation path suitable for high throughput transmission, while the lower rate adaptation path may correspond to the need of long distance transmission, which means that the lower path is a rate adaptation path suitable for long distance transmission.

According to an embodiment of the invention, during the data transmission, the processor 140 may dynamically adjust the transmission rate (TX Rate). For example, the processor 140 may dynamically increase or decrease the transmission rate according to the latest evaluated channel condition. When the transmission rate falls in the range of flexible rate adaptation 700 after the adjustment, the processor 140 may determine to perform rate adaptation in which rate adaptation path according to the current transmission need, so as to select the optimal transmission rate (i.e., including selecting the optimal transmission standard). As shown in FIG. 7, when the transmission rate is decreased or increased to a value that can be supported by the more than one transmission standard, the transmission rate falls in the range of flexible rate adaptation 700. Within the range of flexible rate adaptation 700, the processor 140 may adjust the corresponding transmission parameters, such as the transmission rate (TX Rate), under different selections such as long distance transmission or high throughput transmission, so as to optimize transmission performance.

For example, assuming that an application currently being activated by the user, a function currently being activated by the user, or a current behavior of the user is related to the signal transmission for home appliance control or related to signal transmission for voice communication, the processor 140 may determine that the current transmission need is long distance transmission, so when entering the range of flexible rate adaptation 700, the lower path may be selected for rate adaptation. Assuming that an application currently being activated by the user, a function currently being activated by the user, or the current behavior of the user is related to real-time video signal transmission or video streaming transmission, the processor 140 may determine the current transmission need is high throughput transmission, so when entering the range of flexible rate adaptation 700, the upper path may be selected for rate adaptation.

In the existing rate adaptation technology, since the corresponding modulation and coding schemes can only be selected based on the physical layer data transmission rate (PHY rate), the transmission performance cannot be optimized. In contrast, in the embodiments of the invention, the data transmission rate can be determined intelligently and flexibly according to the current transmission need of the user, so that the relevant transmission parameters are adjusted appropriately, and the optimal transmission performance is achieved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless communication device, comprising:
a processor, configured to, before performing packet transmission, determine a transmission need, determine a transmission rate according to a channel condition and the transmission need, and provide data and information regarding the transmission rate to a baseband signal processing circuit, wherein the information regarding the transmission rate comprises at least one of a selected transmission standard, a selected physical layer data transmission rate and a selected modulation and coding scheme, wherein the processor is further configured to select a first transmission standard as a standard corresponding to high throughput transmission, select a second transmission standard as a standard corresponding to long distance transmission, and when determining the transmission rate, the processor is further configured to select a modulation and coding scheme or a physical layer data transmission rate according to the channel condition, then determine to choose the first transmission standard or the second transmission standard according to the transmission need;
the baseband signal processing circuit, coupled to the processor and configured to process the data according to the information regarding the transmission rate to generate a packet; and
a wireless transceiver circuit, coupled to the baseband signal processing circuit and configured to transmit the packet.

2. The wireless communication device of claim 1, wherein the wireless transceiver circuit is further configured to determine a transmission power according to the information regarding the transmission rate and transmit the packet according to the determined transmission power.

3. The wireless communication device of claim 1, wherein when the processor determines that the transmission rate has to be adjusted according to the channel condition, the processor is further configured to select the modulation and coding scheme or the physical layer data transmission rate according to the channel condition, and determine to choose the first transmission standard or the second transmission standard according to the transmission need.

4. The wireless communication device of claim 1, wherein the processor, the baseband signal processing circuit and the wireless transceiver circuit support a plurality of IEEE 802.11 standards and the selected transmission standard is selected from a group comprising the IEEE 802.11 standards.

5. The wireless communication device of claim 1, wherein the processor determines the transmission need according to an application or a function of the wireless communication device currently activated.

6. The wireless communication device of claim 1, wherein the processor is further configured to dynamically adjust the transmission rate and when the transmission rate falls in a range of flexible rate adaptation, the processor determines to perform rate adaptation in which rate adaptation path according to the transmission need, wherein the range of flexible rate adaptation comprises a plurality of rate adaptation paths, and each rate adaptation path corresponds to at least one transmission need.

7. A wireless communication device, comprising:
a processor, configured to, before performing packet transmission, determine a transmission need, determine a transmission rate according to a channel condition and the transmission need, and provide data and information regarding the transmission rate to a baseband signal processing circuit, wherein the information regarding the transmission rate comprises at least one of a selected transmission standard, a selected physical layer data transmission rate and a selected modulation and coding scheme, wherein the processor is configured to select a first transmission standard as a standard corresponding to high throughput transmission and select a second transmission standard as a standard corresponding to long distance transmission according to at least one of a number of sub-carriers, a transmit spectrum mask, a physical layer data transmission rate and a packet aggregation capability corresponding to each of a plurality of transmission standards;
the baseband signal processing circuit, coupled to the processor and configured to process the data according to the information regarding the transmission rate to generate a packet; and
a wireless transceiver circuit, coupled to the baseband signal processing circuit and configured to transmit the packet.

8. A method for determining data transmission rate, comprising:
determining a channel condition of a wireless communication environment where a wireless communication device is located;
before performing packet transmission, determining a transmission need of the wireless communication device;
determining a transmission rate according to the channel condition and the transmission need, wherein the transmission rate is defined by at least one of a selected transmission standard, a selected physical layer data transmission rate and a selected modulation and coding scheme;
processing data according to the transmission rate to generate a packet;
dynamically adjusting the transmission rate; and
when the transmission rate falls in a range of flexible rate adaptation, determining to perform rate adaptation in which rate adaptation path according to the transmission need;
wherein the range of flexible rate adaptation comprises a plurality of rate adaptation paths, and each rate adaptation path corresponds to at least one transmission need.

9. The method of claim 8, further comprising:
determining a transmission power according to the transmission rate; and
transmitting the packet according to the determined transmission power.

10. The method of claim 8, wherein step of determining the transmission rate according to the channel condition and the transmission need further comprises:
selecting a physical layer data transmission rate as the selected physical layer data transmission rate or selecting a modulation and coding scheme as the selected modulation and coding scheme according to the channel condition; and determining to choose a first transmission standard or a second transmission standard according to the transmission need, wherein the first transmission standard is a standard corresponding to high throughput transmission and the second transmission standard is a standard corresponding to long distance transmission.

11. The method of claim 8, wherein the step of determining the transmission rate according to the channel condition and the transmission need further comprises:

determining whether the transmission rate has to be adjusted according to the channel condition; and when determining that the transmission rate has to be adjusted, selecting a physical layer data transmission rate as the selected physical layer data transmission rate or selecting a modulation and coding scheme as the selected modulation and coding scheme according to the channel condition, and determining to choose a first transmission standard or a second transmission standard according to the transmission need, wherein the first transmission standard is a standard corresponding to high throughput transmission, and the second transmission standard is a standard corresponding to long distance transmission.

12. The method of claim 8, wherein the wireless communication device supports a plurality of IEEE 802.11 standards and the selected transmission standard is selected from a group comprising the IEEE 802.11 standards.

13. The method of claim 8, further comprising:

selecting a first transmission standard as a standard corresponding to high throughput transmission and select a second transmission standard as a standard corresponding to long distance transmission according to at least one of a number of sub-carriers, a transmit spectrum mask, a physical layer data transmission rate and a packet aggregation capability corresponding to each of a plurality of transmission standards, and wherein step of determining the transmission rate according to the channel condition and the transmission need further comprises:

determining to choose the first transmission standard or the second transmission standard as the selected transmission standard according to the transmission need.

14. The method of claim 8, wherein the transmission need is determined according to an application or a function of the wireless communication device currently activated.

* * * * *